(12) United States Patent
Hacikyan (10) Patent No.: US 10,413,990 B2
(45) Date of Patent: Sep. 17, 2019

(54) WELDING PURGE DAM WITH APERTURED PURGE PLATES

(71) Applicant: Michael Hacikyan, Naples, FL (US)

(72) Inventor: Michael Hacikyan, Naples, FL (US)

( * ) Notice: Subject to any disclaimer, the term of this patent is extended or adjusted under 35 U.S.C. 154(b) by 360 days.

(21) Appl. No.: 15/366,690

(22) Filed: Dec. 1, 2016

(65) Prior Publication Data

US 2018/0154474 A1 Jun. 7, 2018

(51) Int. Cl.
| B23K 9/00 | (2006.01) |
| B23K 9/32 | (2006.01) |
| B23K 9/167 | (2006.01) |
| B23K 9/173 | (2006.01) |
| B23K 101/06 | (2006.01) |

(52) U.S. Cl.
CPC ............ B23K 9/326 (2013.01); B23K 9/167 (2013.01); B23K 9/173 (2013.01); *B23K 2101/06* (2018.08)

(58) Field of Classification Search
CPC .......... B23K 9/32; B23K 9/326; B23K 9/325
See application file for complete search history.

(56) References Cited

U.S. PATENT DOCUMENTS

| 3,338,499 A | 8/1967 | Gilbert |
| 3,736,400 A | 5/1973 | Spiegel et al. |
| 4,096,372 A | 6/1978 | Hallenbeck |
| 4,114,655 A | 9/1978 | Bloker |
| 4,415,114 A | 11/1983 | Hallenbeck |
| 4,674,772 A | 6/1987 | Lycan |
| 4,916,281 A | 4/1990 | Flasche et al. |
| 5,100,043 A | 3/1992 | Hallenbeck |
| 5,187,343 A | 2/1993 | Edwards |
| 5,361,972 A | 11/1994 | Barker |
| 5,390,846 A | 2/1995 | Thode |
| 5,583,305 A | 12/1996 | Hirsch et al. |
| 5,669,547 A | 9/1997 | Spring |

(Continued)

FOREIGN PATENT DOCUMENTS

| JP | 05-245633 | 9/1993 |
| JP | 06-23685 | 3/1994 |

(Continued)

OTHER PUBLICATIONS arczone.com, "Purge Bladders Save Time and Money", 2006, 2 pages.

(Continued)

*Primary Examiner* — Erin B Saad
(74) *Attorney, Agent, or Firm* — Walter W. Duft (57) ABSTRACT

A water-degradable welding purge dam apparatus for purging a weld zone of a pipe assembly having first and second pipes having respective first and second pipe ends to be welded together at a root gap. The purge dam apparatus includes a blocking plate assembly having an outer blocking plate, an inner blocking plate, and zero or more interior blocking plates. The blocking plate assembly may be formed from one or more water degradable materials to facilitate removal of the purge dam apparatus from the pipe assembly using an aqueous fluid following welding. At least one of the blocking plates may include a plurality of fluid flow apertures to aid distribution of the aqueous fluid through the blocking plate assembly. If desired, first and second ones of the blocking plate assembly may be ganged together by an interconnection assembly to form a ganged set of blocking plate assemblies.

20 Claims, 5 Drawing Sheets

(56) References Cited

U.S. PATENT DOCUMENTS

| | | | |
|---|---|---|---|
| 5,785,235 | A | 7/1998 | Beatty |
| 6,299,607 | B1 | 10/2001 | Osborn et al. |
| 7,112,258 | B2 | 9/2006 | Klerelid et al. |
| 7,112,358 | B1 | 9/2006 | Hacikyan |
| 7,632,556 | B1 | 12/2009 | Hacikyan |
| 8,061,388 | B1 | 11/2011 | O'Brien et al. |
| 8,292,161 | B2 | 10/2012 | Hacikyan |
| 8,540,137 | B1 | 9/2013 | Hacikyan |
| 8,616,432 | B1 | 12/2013 | Hacikyan |
| 2004/0022676 | A1 | 2/2004 | Hamilton et al. |
| 2005/0072809 | A1 | 4/2005 | Pantelleria et al. |
| 2006/0068142 | A1 | 3/2006 | Hacikyan |
| 2008/0251132 | A1 | 10/2008 | Bentley et al. |
| 2011/0151166 | A1 | 6/2011 | Hacikyan |
| 2011/0210112 | A1 | 9/2011 | Boatner, Jr. |
| 2015/0083785 | A1 | 3/2015 | Park |
| 2016/0030918 | A1 | 2/2016 | Kaimoto et al. |
| 2016/0074955 | A1 | 3/2016 | Evans et al. |

FOREIGN PATENT DOCUMENTS

| | | |
|---|---|---|
| JP | 09-10933 | 9/1997 |
| JP | 2003-266176 | 9/2003 |
| JP | 2010-149164 | 7/2010 |
| KR | 20-0159923 | 11/1999 |
| KR | 20-0179895 | 4/2000 |

OTHER PUBLICATIONS

Weldwide Solutions, "Tandem Ring Purge System", at least as early as Apr. 27, 2012, 3 pages.

Huntingdon Fusion Technologies Limited, "ARGWELD Inflatable Pipe Purging System", Jan. 12, 2008, 2 pages.

Huntingdon Fusion Technologies Limited, "ARGWELD Single Exhaust Pipe Weld Purging Systems 2-6 Inch Pipework", Mar. 15, 2011, 2 pages.

Sumner Manufacturing Co., Inc., "Inflatable Weld Purge System", at least as early as Apr. 27, 2012, 2 pages.

Weldwide Solutions, "Inflatable Purge Systems", at least as early as Jan. 16, 2012, 4 pages.

Safety Main Stopper Co., Inc., "Inflatable Purge Dams", at least as early as Jan. 16, 2012, 2 pages.

Aquasol Corporation, "Purge Bladder: I-Purge Inflatable Purge Dam System", 2010, 6 pages.

AB Paper Co., "Shur-Purge", Jan. 1, 1997, 5 pages.

Intercon, "Water-Soluble Purge Paper", Oct. 1, 2002, 5 pages.

Gilbreth, "Dissolvo", 2001, 8 pages.

PCT International Searching Authority, "Notification of Transmittal of the International Search Report and the Written Opinion of the International Searching Authority, or the Declaration", Counterpart PCT Application No. PCT/US2017/057682 claiming priority to U.S. Appl. No. 15/366,690, dated Feb. 26, 2018, 13 pages.

WELDING PURGE DAM WITH APERTURED PURGE PLATES

BACKGROUND

1. Field

The present disclosure relates generally to inert gas welding. More particularly, the invention is directed to purge dams for retaining purge gas around a weld zone.

2. Description of the Prior Art

By way of background, inert gas welding is a species of arc welding in which the molten weld pool is shielded from atmospheric contamination and oxidation by bathing it with an inert gas, such as Argon, or a mixture of Helium and Argon. Popular examples of inert gas welding include TIG (Tungsten Inert Gas) welding and MIG (Metal Inert Gas) welding.

When welding together pipes and other enclosed structures using inert gas welding, it is important to purge the interior of the pipe or structure in the vicinity of the weld zone to prevent corrosion and the formation of oxides on the interior side of the weld pool. Purge dams are conventionally used for this purpose. For example, when butt-welding the ends of two pipe sections to form a consolidated pipe run, two purge dam structures are placed in the pipes, one in each pipe on either side of the weld zone. A purge gas can then be introduced into the area between the dams.

Water degradable purge dams have been proposed that are made from water degradable paper. The advantage of water degradable paper purge dams is that they can be placed in close proximity to a weld zone, and then removed following welding by dissolving or otherwise degrading them with water introduced through the pipe. Insofar as pipe systems typically undergo hydrostatic pressure testing or flushing with water prior to use, water degradable purge dams can be used in many cases without any additional processing steps following welding. Such purge dams are typically formed from a sheet of water degradable paper that is formed into a concave shape in which a central portion of the purge dam spans across the diameter to the pipe to be welded and a peripheral edge portion of the purge dam engages the pipe wall so that it can be secured thereto, such as by using water soluble tape.

Conventional water degradable purge dams as described above are designed for use with pipe installations with little or no air flow within the pipes being welded. However, there are some environments in which conventional water degradable purge dams are not practical because the purge dams cannot withstand air pressure fluctuations within the pipes. For example, underwater pipelines that are miles in length can develop large bidirectional air pressure surges. Undersea pipeline installation contractors sometimes refer to this phenomenon as "suck and blow." When fabricating such pipelines, the end of the existing portion of the pipeline is fixtured at the surface by a pipe-laying vessel that carries the next run of pipe, which itself may be several miles in length, on a spool. Inert gas welding to connect the ends of the two pipe sections is performed onboard the ship using a welding jig that aligns the pipe sections to form a welding root gap. However, it is first necessary to ensure that the bidirectional air flow within the pipe sections cannot enter the weld zone, where it would quickly displace the purge gas. This is typically done by inserting blocking members, made from a suitable foam material, into the ends of the pipe sections. Unfortunately, this practice has met with mixed success because the blocking member can dislodge if the air pressure fluctuations are large enough, and may be difficult to remove following welding.

Applicant submits that there is presently a need for improvement in the construction of water-degradable purge dams, including for high air flow environments. What is required in particular is a purge dam apparatus that can be used in long pipelines that develop significant bidirectional air pressure fluctuations therein. It would be additionally desirable to improve the efficiency of purge dam degradation following welding. This would facilitate the construction of sturdy and robust water-degradable purge dams that are suitable for use in high air pressure environments, while ensuring that rapid and complete purge dam degradation occurs at purge dam removal time.

SUMMARY

A water-degradable welding purge dam apparatus for purging a weld zone of a pipe assembly having first and second pipes with respective first and second pipe ends to be welded together at a root gap. The purge dam apparatus includes a blocking plate assembly having an outer blocking plate, an inner blocking plate, and zero or more interior blocking plates. The blocking plate assembly may be formed from one or more water degradable materials to facilitate removal of the purge dam apparatus from the pipe assembly using an aqueous fluid following welding. At least one of the blocking plates may include a plurality of fluid flow apertures to aid distribution of the aqueous fluid through the blocking plate assemblies.

In an embodiment, the purge dam apparatus may include first and second ones of the blocking plate assembly. The blocking plate assemblies may be ganged together by an interconnection assembly to provide a ganged set of blocking plate assemblies. The interconnection assembly may be formed from one or more water degradable materials to further facilitate removal of the purge dam apparatus from the pipe assembly.

In another aspect, a weld zone purging installation may be formed in a pipe assembly that includes first and second pipes having respective first and second pipe ends to be welded together at a root gap. A water-degradable purge dam apparatus as summarized above may be disposed in each of the first and second pipes proximate to the first and second pipe ends to define a weld zone that spans the root gap.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
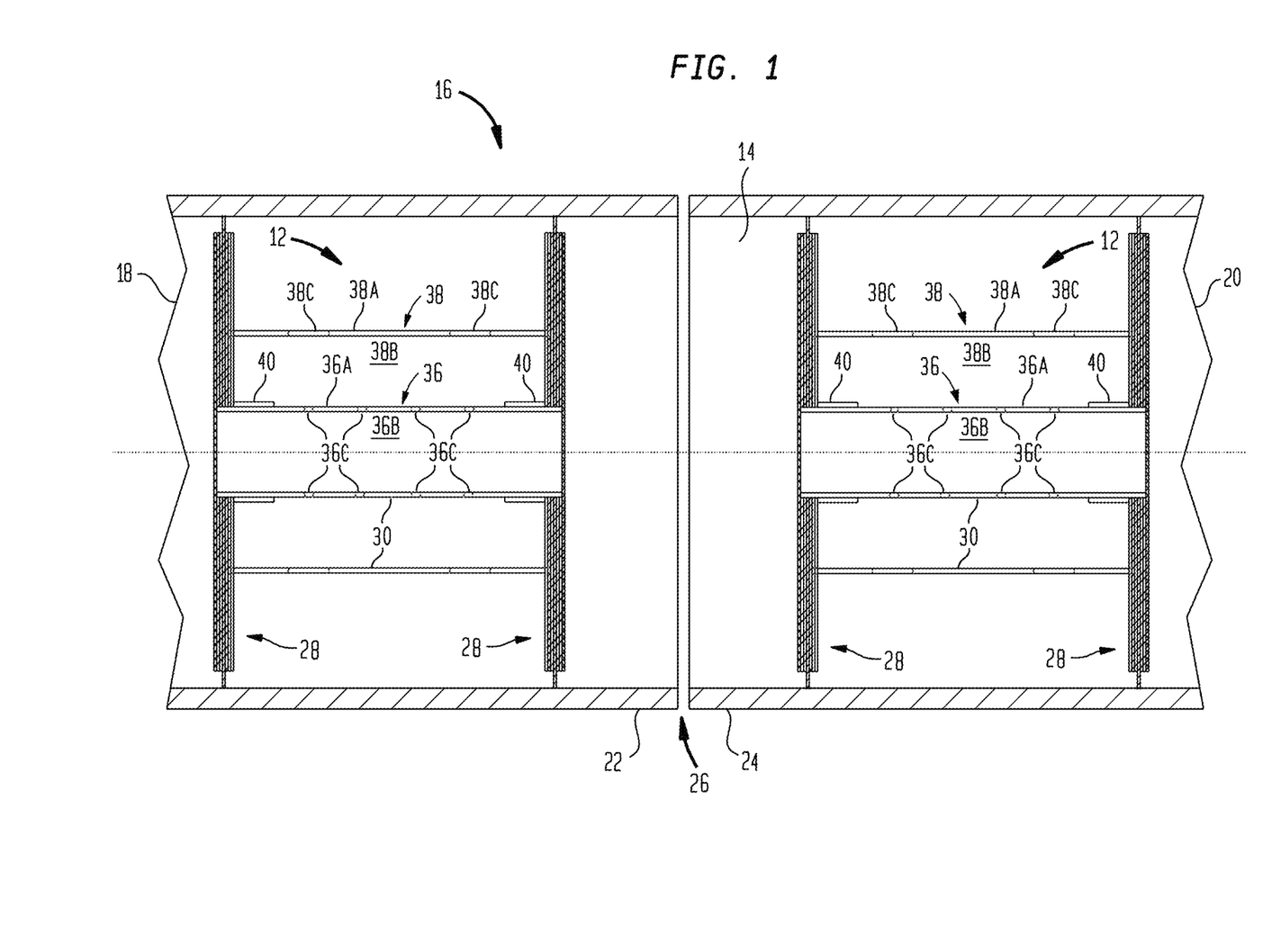
FIG. 1 is a cross-sectional centerline view showing a portion of a pipe assembly having installed therein a pair of purge dam apparatus that may be constructed in accordance an embodiment with the present disclosure.

Turning now to the drawing figures, which are not necessarily to scale, like reference numbers are used to represent like elements in all of the several views. FIG. 1 illustrates a weld zone purging installation that includes two identical water-degradable purge dam apparatus 12 constructed in accordance with an example embodiment of the disclosed subject matter. In the illustrated installation, the two purge dam apparatus 12 are arranged to define a weld zone 14 that is to be purged of oxygen within a pipe assembly 16. The pipe assembly 16 includes a first (left-side) pipe 18 and second (right-side) pipe 20. The first and second pipes 18 and 20 have respective first and second pipe ends 22 and 24 that are to be butt-welded together at a root gap 26. One of the purge dam apparatus 12 is arranged inside the first pipe end 22 of the first pipe 18. The other purge dam apparatus 12 is arranged inside the second pipe end 24 of the second pipe 20. The purge dam apparatus 12 are spaced from the root gap 26 at a distance that is sufficient to prevent purge dam degradation due to the heat of the welding operation.

Each purge dam apparatus 12 may be formed from one or more air flow blocking plate assemblies 28. If the purge dam apparatus 12 includes more than one blocking plate assembly 28, the blocking plate assemblies may either be interconnected or non-interconnected. An interconnected construction is shown in FIG. 1, which depicts an embodiment wherein each purge dam apparatus 12 is formed as a ganged set of spaced-apart blocking plate assemblies 28. In the illustrated embodiment, the blocking plate assemblies 28 are ganged together by an interconnection assembly 30.

Some or all of the components of the blocking plate assemblies 28 and the interconnection assembly 30 may be formed from water degradable materials so that the purge dam apparatus 12 can be sufficiently degraded using water or other aqueous fluids to enable purge dam removal from the pipe assembly 16 following welding. A variety of water degradable materials may be used. Suitable water degradable materials will be preferably designed to (1) provide low (or zero) air permeability for critical welding applications, (2) provide sufficient strength to withstand both purge gas pressure and bidirectional air flow pressures within the pipes 18 and 20, (3) allow the purge dam components to be easily formed and manipulated from flat sheet stock into their final shapes, and (4) degrade under hydrostatic pressure testing or flushing of the pipe structure with water or other aqueous fluids to facilitate purge dam removal following welding.

Example water degradable materials include, but are not limited to, water degradable paper or board, a water degradable polymer, or a combination of water degradable paper or board and a water degradable polymer. Suitable water degradable paper and board materials are available from Aquasol Corporation of North Tonawanda, N.Y. under the trademark Aquasol®. The Aquasol® brand paper and board products are water soluble and made of Sodium Carboxy Methyl cellulose and wooden pulp that dissolves rapidly and completely in most liquids, including water. A suitable water degradable polymer is polyvinyl alcohol (PVOH), which may be manufactured in film form or as a molded three-dimensional structure. Regardless of whether the water degradable material is paper board, polymer, or a combination of such materials, one or more layers of the selected material may be fabricated into water degradable sheets of varying thickness. The sheet thicknesses may be selected according to the strength and flexibility requirements of the various structural components of the purge dam apparatus 12. In an embodiment, a lamination process may be used to construct water degradable sheets having the required thickness. The water degradable sheets may be cut into any desired shape (prior to or after lamination) that is useful for purge dam formation, including but not limited to tubular shapes and circular shapes, as will now be described. A suitable water degradable adhesive may be used to combine the structural components of the purge dam apparatus 12.

Figure 2:
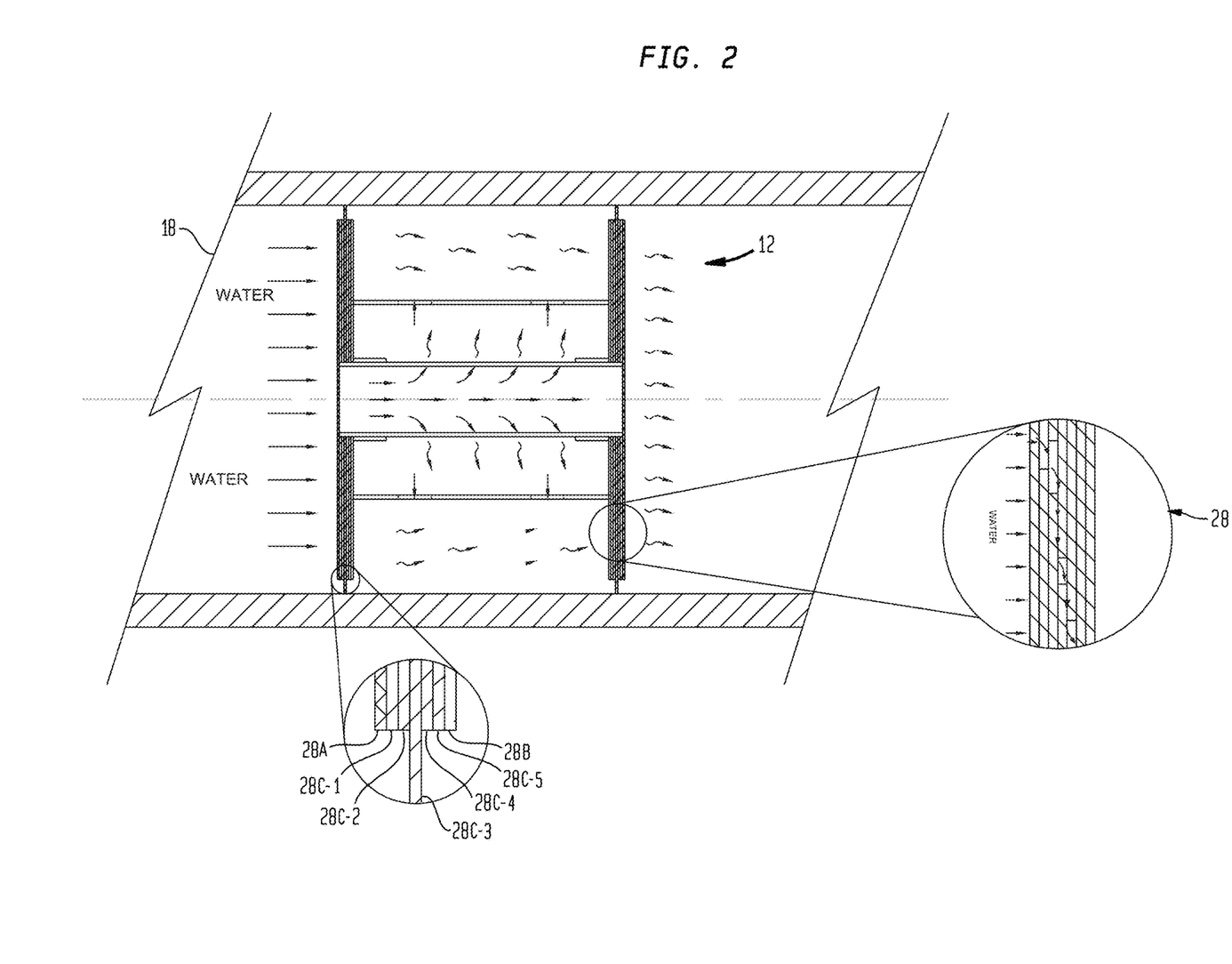
FIG. 2 is a cross-sectional centerline view showing a portion of one pipe of the pipe assembly of FIG. 1 having installed therein one of the purge dam apparatus of FIG. 1.

With additional reference now to FIG. 2, which illustrates a portion of the left-hand pipe 18, each blocking plate assembly 28 may have an outer blocking plate 28A, an inner blocking plate 28B and zero or more interior blocking plates 28C. By way of example only, and not by way of limitation, FIG. 2 depicts an example embodiment in which there are five interior blocking plates 28C-1 through 28C-5. This embodiment thus provides a seven-plate stack of blocking plates in each blocking plate assembly 28. In some embodiments (not shown), additional blocking plates may be added. In other embodiments (not shown), fewer blocking plates could be used. For example, such an embodiment might only include the outer blocking plate 28A and the inner blocking plate 28B.

The blocking plate assemblies 28 may be formed as a layered structure in which the various blocking plates 28A, 28B and 28C are bonded or otherwise secured together in a suitable manner. For example, a water-degradable adhesive could be applied between the layers. Other fabrication techniques may also be used, including techniques that do not require the application of adhesive, such as heat bonding, etc.

Because pipes tend to be cylindrical, the blocking plates 28A, 28B and 28C may be substantially disk-shaped. However, other shapes could be used for purging structures that do not have circular cross-sections, such as ducts or other types of conduits that may be square, rectangular or of other shape. The thickness of each blocking plate 28A, 28B and 28C, as well as the total thickness of each blocking plate assembly 28, is a matter of design choice that will depend on various factors, including the size of the pipes 18 and 20 and the purge gas and air pressures that must be resisted by the purge dam apparatus 12. It should also be noted that the blocking plates 28A, 28B and 28C could be of varying thickness relative to each other.

Figure 3:
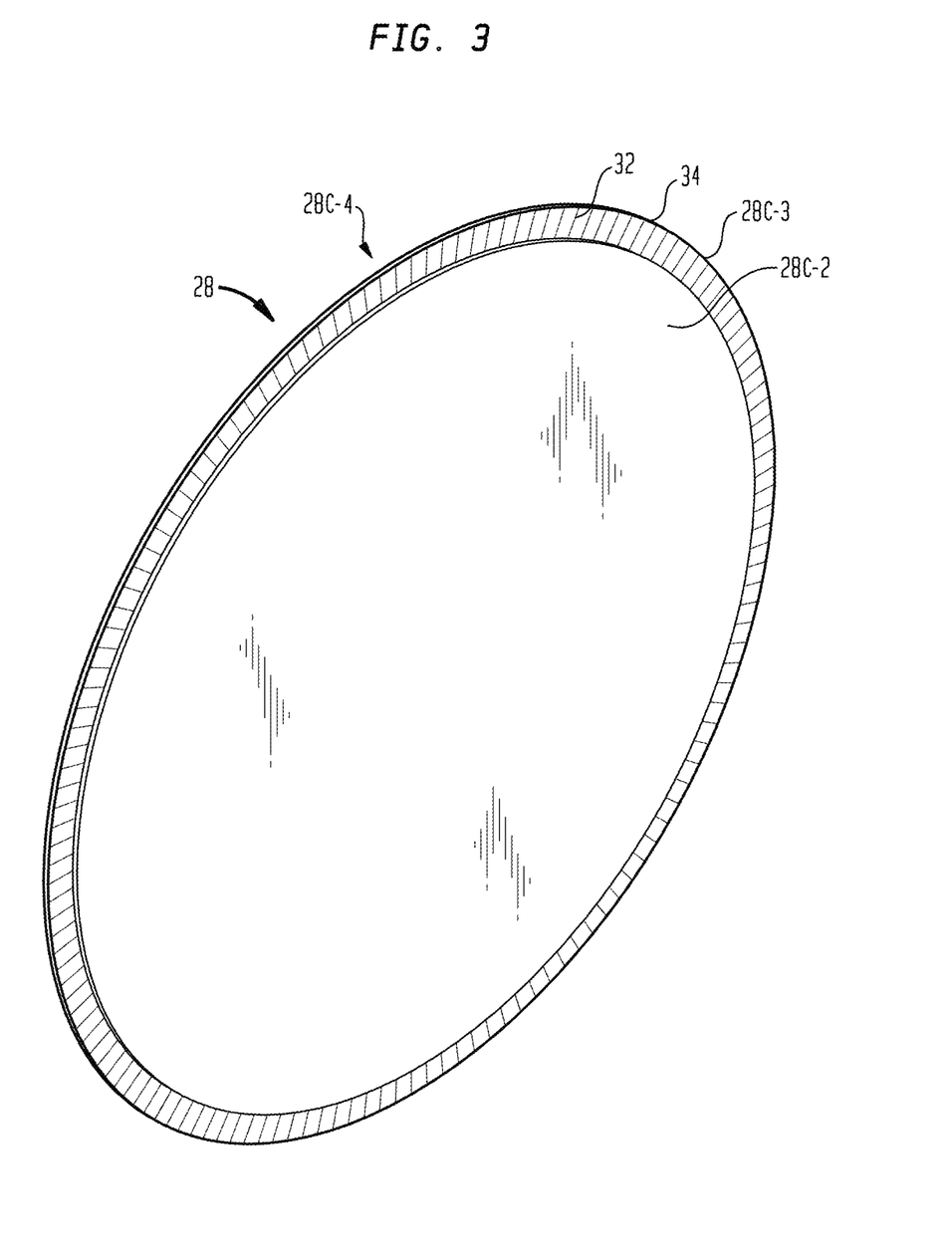
FIG. 3 is a perspective view showing a friction plate component of the purge dam apparatus of FIG. 1.

In an example embodiment, one or more of the plates 28A, 28B and 28C may be formed as a friction plate adapted to flexibly engage an inside wall of one of the first or second pipe ends 22 and 24. By way of example, FIG. 2 depicts an embodiment in which the central interior blocking plate 28C-3 provides such a friction plate. FIG. 3 illustrates an example construction in which the friction plate 28C-3 is formed with a plurality of flexible sidewall members 32 on its periphery. The flexible members 32 are adapted to flexibly engage an inside wall of one of the first or second pipe ends 22 and 24, such that the purge dam apparatus 12 is self-retaining in the pipe assembly 16. As used herein, the term "self-retaining" refers to the fact that no external retention components or materials, such as adhesive tape, glue, fasteners, etc., are required to retain the purge dam 12 apparatus in engagement with the pipe end inside walls. The desired self-retention property of the purge dam apparatus 12 is due to two factors. First, the diameter of the friction plate 28C-3 is somewhat larger than the inside diameter of the pipe ends 22 and 24. This forces the free ends of the flexible members 32 to bend when the purge dam apparatus 12 is installed. Second, the flexible members 32, as well as the remainder of the friction plate 28C-3, are sufficiently stiff to develop radial forces between the flexible members 32 and the pipe end inside walls as the flexible members bend during purge dam installation. These radial forces in turn create longitudinal friction forces along the pipe end inside walls that oppose air or purge gas pressures that might otherwise displace the purge dam 12 in the longitudinal direction within the pipe ends 22 and 24.

In the illustrated embodiment of FIGS. 1-3, the flexible members 32 comprise flexible finger-shaped tabs defined by slits in the friction plate member periphery 34. The slits may be formed using any suitable technique, such as die cutting. Preferably, there are no appreciable gaps between the flexible members 32, such that bending the flexible members during purge dam installation does not allow an appreciable amount of purge gas to leave the weld zone 14 or air to enter the weld zone from within the pipes 18 and 20. It will be appreciated that other types of flexible members 32 may also be used.

As best shown in FIGS. 2 and 3, the blocking plates 28C-2 and 28C-4 stacked on each side of the friction plate 28C-3 serve as support plates that support the friction plate member 28C-3 and provide structural rigidity. Note that FIG. 3 illustrates the support plates 28C-2 and 28C-4, but not the remaining blocking plates of the blocking plate assemblies 28. However, the remaining blocking plates do function to some extent as support plates. This includes the outer plate 28A and the interior plate 28C-1 on the left side of the friction plate 28C-3, and the interior plate 28C-5 and the inner plate 28B on the right side of the friction plate. Each of the support plate members 28A, 28C-1, 28C-2, 28C-4, 28C-5 and 28B have a periphery that may be aligned with a base of the friction disk flexible members 32 so as not to impede the desired flexing characteristic.

FIG. 3 also illustrates what a purge dam apparatus 12 might look like if it included only a single blocking plate assembly. In such an embodiment, the support plates 28C-2 and 28C-4 could respectively serve as the outer blocking plate 28A and the inner blocking plate 28B, with the friction plate 28C-3 providing a single interior plate 28C. It will be further appreciated that although FIGS. 1-3 depict an embodiment in which the center blocking plate 28C-3 is a friction plate, any of the other blocking plates could be configured as friction plates, either alone or in combination with other blocking plates. If either the outer blocking plate 28A or the inner blocking plate 28B are configured as friction plates, there will be support plates stacked on only one side of the friction plate. For example, in FIG. 3, this would be the case if the support plate 28C-4 were eliminated, such that the support plate 28C-2 serves as the outer blocking plate 28A and the friction plate 28C-3 serves as the inner blocking plate 28B.

As previously discussed, the purge dam apparatus 12 may be degraded and removed from the pipes 18 and 20 using water or other suitable aqueous fluid following a welding operation. FIG. 2 illustrates the application of water to the purge dam apparatus 12 so as to remove it from the pipe 18. In order to provide rapid and robust purge dam degradation, one or more of the blocking plates 28A, 28B and 28C may include a plurality of fluid flow apertures that aid distribution of the aqueous fluid through the blocking plate assemblies. The inset view on the right side of FIG. 2, together with FIGS. 4 and 5A-5C, illustrate an embodiment wherein the interior blocking plates 28C-1 through 28C-5 are formed with such apertures.

Figure 4:
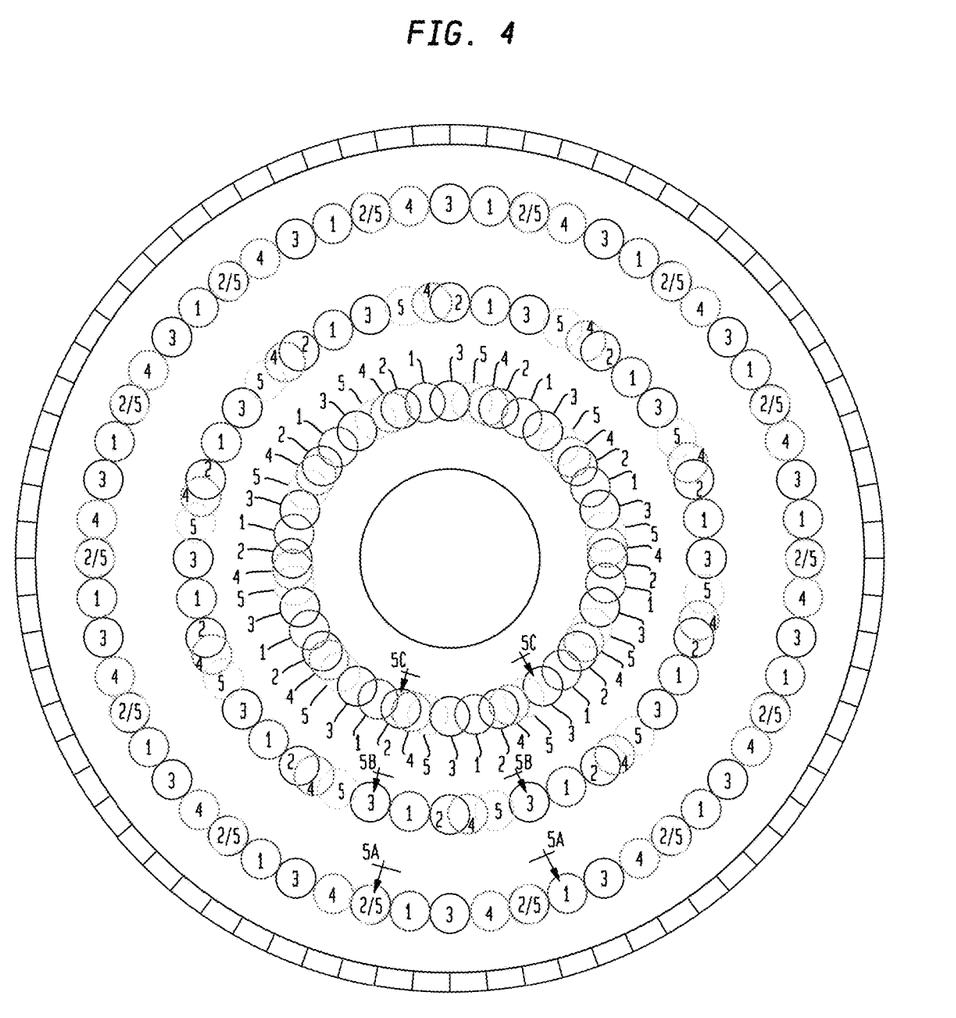
FIG. 4 is a diagrammatic plan view of a blocking plate assembly of the purge dam apparatus of Fig. showing example fluid flow apertures that may be formed in one or more blocking plates therein.

In FIG. 4, the fluid flow apertures are numbered 1-5 to indicate the corresponding interior blocking plate in which they are formed. Thus, the apertures labeled with reference number 1 are all formed in the interior blocking plate 28C-1, the apertures labeled with reference number 2 are all formed in the interior blocking plate 28C-2, the apertures labeled with reference number 3 are all formed in the interior blocking plate 28C-3, the apertures labeled with reference number 4 are all formed in the interior blocking plate 28C-4, and the apertures labeled with reference number 5 are all formed in the interior blocking plate 28C-5. Although the illustrated embodiment does not have fluid flow apertures in the outer blocking plate 28A or the inner blocking plate 28B, one or both of these blocking plates could have such apertures if so desired.

The fluid flow apertures may be formed in any desired pattern and may be of any desired shape or size, depending on the manner in which the aqueous fluid is to be directed through the blocking plate assembly 28. The circular fluid flow aperture arrangement shown in FIG. 4 is merely one possible example. It will also be seen that FIG. 4 depicts circular fluid flow apertures of a particular size. However, other shapes and/or sizes may also be used for the fluid flow apertures.

The purpose of the fluid flow apertures is to allow the aqueous fluid to distribute more rapidly and completely through the blocking plate assembly. Due to the water degrading properties of the blocking plate material, the aqueous fluid will migrate both longitudinally through the blocking plates and laterally between the interfaces between adjacent blocking plates. This is illustrated by the fluid flow arrows in FIGS. 5A-5C. In these drawing Figures, the aqueous fluid enters the blocking plate assembly 28 and passes through the outer blocking plate 28A, migrates through the interior blocking plates 28C-1 through 28C-5, then exits the blocking plate assembly by passing through the inner blocking plate 28B. Although, fluid migration will occur even without the fluid flow apertures, the apertures accelerate longitudinal fluid migration relative to lateral fluid migration by providing longitudinal vias through the blocking plates.

The ratio of longitudinal fluid migration relative to lateral fluid migration may be controlled by selectively positioning the fluid flow apertures. For example, as can be seen in FIGS. 4 and 5A-5C, the fluid flow apertures for a given pair of adjacent blocking plates (i.e., blocking plates that are in interfacial engagement with each other) may at least partially laterally overlap one another. This will increase longitudinal fluid migration relative to lateral fluid migration as compared to a configuration in which the fluid flow apertures are fully laterally misaligned relative to each other (as many of apertures are in FIGS. 4 and 5A-5C).

Figure 5A:
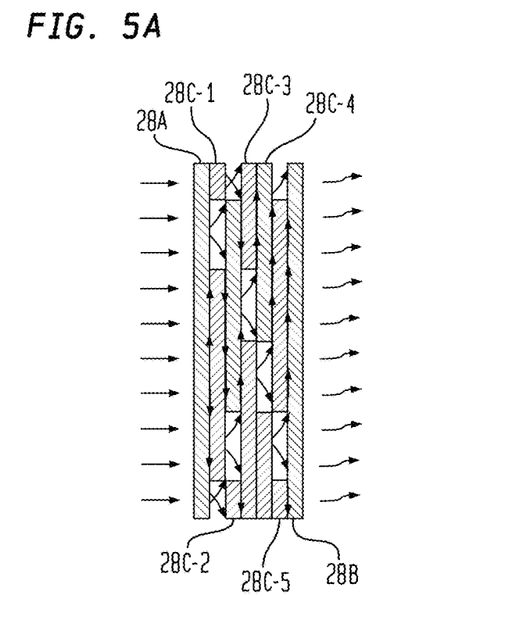
FIG. 5A is cross-sectional view taken along line 5A-5A in FIG. 4.
Figure 5B:
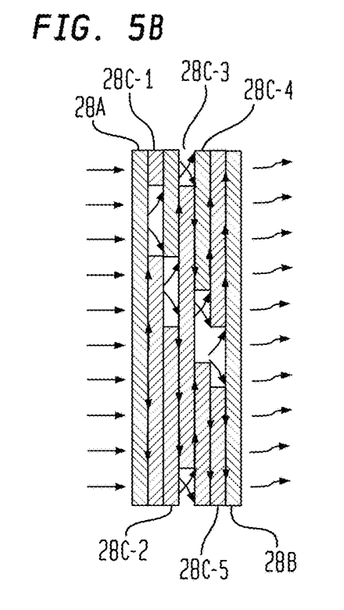
FIG. 5B is cross-sectional view taken along line 5B-5B in FIG. 4.
Figure 5C:
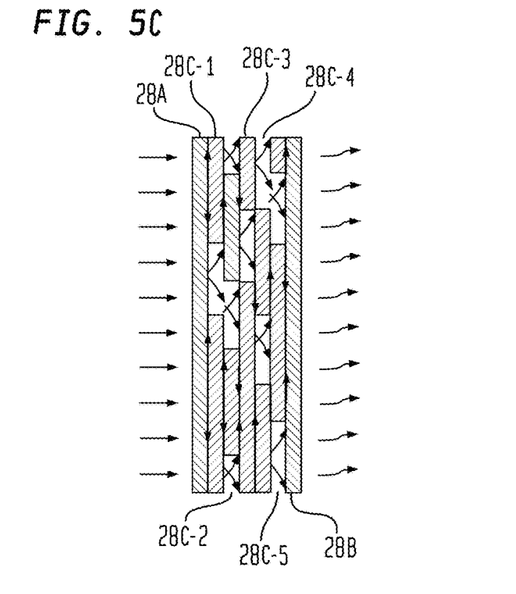
FIG. 5C is cross-sectional view taken along line 5C-5C in FIG. 4.

Laterally overlapping fluid flow apertures are shown by FIG. 5B in the interior blocking layers 28C-4 and 28C-5. FIG. 5C also shows laterally overlapping fluid flow apertures in the interior blocking layers 28C-1 and 28C-2, and in the interior blocking layers 28C-4 and 28C-5. The amount of lateral overlap will dictate the speed of longitudinal fluid migration. To maximize the rate of longitudinal fluid migration, the fluid flow apertures in any given pair of adjacent blocking plates may be fully aligned with each other. Note that the illustrated embodiment does not use such a configuration because doing so may reduce the structural strength of the blocking plate assembly 28. Instead, as shown in FIGS. 4 and 5A, the fluid flow apertures are only fully aligned in different pairs of adjacent blocking plates. For example, in the outermost set of fluid flow apertures of FIG. 4 and in the corresponding cross-sectional illustration of FIG. 5A, the fluid flow apertures in the interior blocking plates 28C-2 and 28C-5 are fully aligned. By allowing only partially offsetting fluid flow apertures between adjacent blocking plates, with the remaining fluid flow apertures being fully laterally offset from each other, it is possible for the blocking plate assembly 28 to maintain substantially the same structural strength as a completely solid blocking plate assembly while still reducing purge dam degradation time.

The fluid flow apertures may also be positioned to encourage fluid migration in desired lateral directions through the blocking plate assembly 28. For example, by laterally staggering the fluid flow apertures of successive blocking plates in a particular direction, the aqueous fluid can be induced to flow laterally in that direction. In FIG. 5A, aqueous fluid that passes through the outer blocking plate 28A will be directed to migrate in both the left and right lateral directions according to the aperture staggering in those directions.

Returning now to FIGS. 1-2, the interconnection assembly 30 may also include fluid flow apertures. In the illustrated embodiment, the interconnection assembly 30 includes an inner interconnection structure 36 and an outer interconnection structure 38. The inner connection structure 36 includes a wall 36A surrounding a hollow interior 36B. If desired, the interconnection structure wall 36A may include a plurality of fluid flow apertures 36C to aid distribution of the aqueous fluid from the hollow interior 36B to an exterior region outside the interconnection structure wall 36A.

The interconnection structure 36 may be of any desired cross-sectional shape, including circular, polygonal, etc. The blocking plate assemblies 28 may be attached to the interconnection structure 36 in any desired manner. For example, as shown in FIGS. 1-2, the outer blocking plates 28A of the blocking plate assemblies 28 may be respectively attached to opposite ends of the interconnection structure wall 36A. The remaining blocking plates 28B and 28C may be formed with a central opening that attaches to a side portion of the interconnection structure wall 36A. In order to better secure the interior and inner blocking plates 28B and 28C, a retainer 40 may be attached to the side portion of the interconnection structure wall 36A, abutting the inside face of the inner blocking plate 28B. Any suitable technique may be used to formed the above-described attachments, such as by using adhesive or other forms of bonding.

The outer interconnection structure 38 surrounds the inner interconnection structure 36, and may be of any desired cross-sectional shape. The outer interconnection structure 38 may include a wall 38A that surrounds a hollow interior 38B. The ends of the wall 38A may be attached to the inside faces of the inner blocking plates 28B, such as by using adhesive or other suitable forms of bonding. If desired, the outer interconnection structure wall 38A may include a plurality of fluid flow apertures 38C to aid distribution of the aqueous fluid from the hollow interior 38B to an exterior region outside the interconnection structure wall 38A.

Returning now to FIG. 1, installation of the purge dam apparatus 12 in the pipe assembly 16 may be performed using the installation method now to be described. Initially, the pipes 18 and 20 may be separated a considerable distance so that each purge dam apparatus 12 may be respectively introduced into the pipe ends 22 and 24. Note that the friction plate 28C-3 of each blocking plate assembly 28 may fit sufficiently tightly within the pipe ends 22 and 24 to require that the purge dam apparatus 2 be pounded into the pipe ends by applying a striking force against the end of the each purge dam apparatus (i.e., against the exposed outer blocking plate 28A).

Once the purge dam apparatus 12 are installed in the pipes 18 and 20, the pipe ends 22 and 24 may be brought together into the weld zone purging installation configuration of FIG. 1, in which the weld zone 14 and root gap 26 are formed and the pipe ends are ready for welding. Purge gas introduced through the root gap 26 will be retained in the weld zone 14 by virtue of the blocking assemblies 28, and pressurized air will likewise be prevented from entering the weld zone from the interior of the first and second pipes 18 and 20.

Once the pipe ends 22 and 24 are fully welded together at the root gap 26, the purge dam apparatus 2 may be conveniently removed from the pipe assembly 16 using a water-based material passed through one or both of the pipes 18 and 20. For example, the pipe assembly 16 may be flushed with water to degrade the purge dam apparatus 12, so that they break apart and flow along the pipes to an exit point, which may be a non-welded end of one of the pipes 18 or 20. For some water-degradable materials, such as water soluble paper and/or polymer laminates, the purge dam apparatus 12 may completely dissolve as a result of such flushing. In other constructions, the purge dam apparatus 12 may not fully dissolve, but will be sufficiently degraded to the point where they can be flushed or otherwise removed from the pipes.

Accordingly, a water-degradable purge dam apparatus, together with a related weld zone purging installation, have been disclosed. While various embodiments have been described, it should be apparent that many variations and alternative embodiments could be implemented in accordance with the invention. It is understood, therefore, that an invention as disclosed herein is not to be in any way limited except in accordance with the spirit of the appended claims and their equivalents.

What is claimed is:

1. A water-degradable welding purge dam apparatus for purging a weld zone of a pipe assembly comprising first and second pipes having respective first and second pipe ends to be welded together at a root gap, said purge dam apparatus comprising:
   a blocking plate assembly having an outer blocking plate, an inner blocking plate, and zero or more interior blocking plates;
   said blocking plate assembly comprising one or more water degradable materials to facilitate removal of said purge dam apparatus from said pipe assembly using an aqueous fluid following welding; and
   at least one of said blocking plates comprising a plurality of fluid flow apertures formed in a pattern to aid distribution of said aqueous fluid through said blocking plate assembly.

2. The purge dam apparatus of claim 1, wherein there are first and second ones of said blocking plate assembly that are ganged together by an interconnection assembly to provide a ganged set of spaced-apart air flow blocking plate assemblies, said interconnection assembly comprising one or more water degradable materials to further facilitate removal of said purge dam apparatus from said pipe assembly.

3. The purge dam apparatus of claim 1, wherein said blocking plate assembly comprises at least one pair of blocking plates in mutual facing engagement with each other, each blocking plate of said blocking plate pair having a plurality said fluid flow apertures.

4. The purge dam apparatus of claim 3, wherein at least some of said fluid flow apertures in respective ones of said blocking plates in said blocking plate pair are partially laterally overlapping relative to each other.

5. The purge dam apparatus of claim 3, wherein at least some of said fluid flow apertures in respective ones of said blocking plates in said blocking plate pair are fully laterally misaligned relative to each other.

6. The purge dam apparatus of claim 1, wherein each said blocking plate assembly comprises two or more pairs of blocking plates in mutual facing engagement with each other, each blocking plate of said two or more blocking plate pairs having a plurality said fluid flow apertures.

7. The purge dam apparatus of claim 6, wherein at least some of said fluid flow apertures in blocking plates that are not part of the same blocking plate pair are partially laterally aligned relative to each other.

8. The purge dam apparatus of claim 6, wherein at least some of said fluid flow apertures in blocking plates that are not part of the same blocking plate pair are fully laterally aligned relative to each other.

9. The purge dam apparatus of claim 1, wherein said blocking plate assembly includes at least one interior blocking plate having said fluid flow apertures, and wherein said outer blocking plate and said inner blocking plate do not include said fluid flow apertures.

10. The purge dam apparatus of claim 2, wherein said interconnection assembly comprises an interconnection structure having a wall surrounding a hollow interior.

11. The purge dam apparatus of claim 10, wherein said interconnection structure wall comprises a plurality of fluid flow apertures to aid distribution of said aqueous fluid from said hollow interior to an exterior region outside said interconnection structure wall.

12. The purge dam apparatus of claim 2, wherein said interconnection assembly comprises first and second interconnection structures that interconnect said blocking plate assemblies.

13. The purge dam apparatus of claim 12, wherein said second interconnection structure surrounds said first interconnection structure.

14. The purge dam apparatus of claim 13, wherein said first and second interconnection structures each comprise a wall surrounding a hollow interior, and one or both of said first and second interconnection structure wall comprise a plurality of fluid flow apertures to aid distribution of said aqueous fluid from said hollow interior to an exterior region outside said interconnection structure wall.

15. The purge dam apparatus of claim 1, wherein said blocking plate assembly comprises at least one friction plate having a plurality of flexible sidewall members on its periphery adapted to flexibly engage an inside wall of one of said first or second pipe ends.

16. The purge dam apparatus of claim 15, wherein said flexible members comprise flexible tabs defined by slits in said disk periphery.

17. The purge dam apparatus of claim 16, wherein said blocking plate assembly comprises one or more support plates stacked on one or both sides of said friction plate.

18. The purge dam apparatus of claim 17, wherein said one or more support plates have a periphery that is aligned with a base of said friction plate flexible tabs.

19. A weld zone purging installation, comprising:
a pipe assembly comprising first and second pipes having respective first and second pipe ends to be welded together at a root gap;
a water-degradable purge dam apparatus disposed in each of said first and second pipes proximate to said first and second pipe ends to define a weld zone spanning said root gap;
said water-degradable purge dam apparatus, comprising:
a blocking plate assembly having an outer blocking plate, an inner blocking plate and zero or more interior blocking plates;
said blocking plate assembly comprising one or more water degradable materials to facilitate removal of said purge dam apparatus from said pipe assembly using an aqueous fluid following welding; and
at least one of said blocking plates comprising a plurality of fluid flow apertures formed in a pattern to aid distribution of said aqueous fluid through said blocking plate assembly.

20. A water-degradable welding purge dam apparatus for purging a weld zone of a pipe assembly comprising first and second pipes having respective first and second pipe ends to be welded together at a root gap, said purge dam apparatus comprising:
a ganged set of spaced-apart air flow blocking plate assemblies;
each blocking plate assembly having an outer blocking plate, an inner blocking plate and zero or more interior blocking plates;
said blocking plate assemblies being ganged together by an interconnection assembly that interconnects said blocking plate assemblies;
said blocking plate assemblies and said interconnection assembly comprising one or more water degradable materials to facilitate removal of said purge dam apparatus from said pipe assembly using an aqueous fluid following welding;
at least one of said blocking plates comprising a plurality of fluid flow apertures to aid distribution of said aqueous fluid through said blocking plate assemblies;
each said blocking plate assembly comprising at least one pair of blocking plates in mutual facing engagement with each other, each blocking plate of said blocking plate pair having a plurality said fluid flow apertures;
some or all of said fluid flow apertures in respective ones of said blocking plates in said blocking plate pair being at partially laterally overlapping relative to each other;
said interconnection assembly comprising an interconnection structure having a wall surrounding a hollow interior, said interconnection structure wall comprising a plurality of fluid flow apertures to aid distribution of said aqueous fluid from said hollow interior to an exterior region outside said interconnection structure wall;
each said blocking plate assembly comprising at least one friction plate having a plurality of flexible sidewall members on its periphery adapted to flexibly engage an inside wall of one of said first or second pipe ends; and
said flexible members comprising flexible tabs defined by slits in said disk periphery.

* * * * *